US012793682B2

(12) United States Patent
Tsuge et al.

(10) Patent No.: US 12,793,682 B2
(45) Date of Patent: Nov. 10, 2026

(54) PERCUSSION INSTRUMENT DRIVING DEVICE AND PERCUSSION INSTRUMENT KIT

(71) Applicant: YAMAHA CORPORATION, Hamamatsu (JP)

(72) Inventors: Yoshiyuki Tsuge, Hamamatsu (JP); Yu Sasaki, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 891 days.

(21) Appl. No.: 18/194,847

(22) Filed: Apr. 3, 2023

(65) Prior Publication Data

US 2023/0252965 A1 Aug. 10, 2023

Related U.S. Application Data

(63) Continuation of application No. PCT/JP2021/034640, filed on Sep. 21, 2021.

(30) Foreign Application Priority Data

Oct. 6, 2020 (JP) ................................ 2020-168986

(51) Int. Cl.

*G10H 3/14* (2006.01)
*G10D 13/02* (2020.01)
*G10D 13/10* (2020.01)

(52) U.S. Cl.

CPC ............ *G10H 3/146* (2013.01); *G10D 13/02* (2013.01); *G10D 13/10* (2020.02); *G10H 2220/461* (2013.01)

(58) Field of Classification Search

CPC .. G10H 3/146; G10H 2220/461; G10D 13/10; G10D 13/02

(Continued)

(56) References Cited

U.S. PATENT DOCUMENTS 4,168,646 A * 9/1979 May ....................... G10D 13/02 84/DIG. 12
4,899,636 A * 2/1990 Chiba ....................... B06B 1/06 381/345

(Continued)

FOREIGN PATENT DOCUMENTS

CN 210327990 U * 4/2020
EP 3550851 A1 * 10/2019 ............ H04R 1/028

(Continued)

OTHER PUBLICATIONS

International Search Report issued in Intl. Appln. No. PCT/JP2021/034640 mailed Nov. 30, 2021. English translation provided.

(Continued)

*Primary Examiner* — Christina M Schreiber
(74) *Attorney, Agent, or Firm* — ROSSI, KIMMS & McDOWELL LLP

(57) ABSTRACT

A percussion instrument driving device includes an actuator and an actuator mount. The actuator includes an actuator surface configured to vibrate in response to an electrical signal to vibrate a vibration surface of a percussion instrument from outside of the percussion instrument. The actuator mount is disposed outside the percussion instrument having a vibration surface. The actuator mount is configured to mount the actuator to the percussion instrument from outside of the percussion instrument, with the actuator surface facing the vibration surface and spaced from the vibration surface.

10 Claims, 2 Drawing Sheets

(58) Field of Classification Search
USPC .............................................................. 84/723
See application file for complete search history.

(56) References Cited

U.S. PATENT DOCUMENTS

| | | | | |
|---|---|---|---|---|
| 6,172,289 | B1 * | 1/2001 | Shelley | G10D 13/02 84/723 |
| 6,925,880 | B1 * | 8/2005 | Roberts | G01N 29/12 73/579 |
| 7,560,632 | B1 * | 7/2009 | Lanzel | G10D 13/02 84/411 R |
| 7,657,051 | B1 * | 2/2010 | Kahoe | H04R 1/021 84/723 |
| 7,723,596 | B2 * | 5/2010 | Kelly | H04R 1/083 84/421 |
| 8,283,544 | B2 * | 10/2012 | Zuffante | G10D 13/16 84/413 |
| 2014/0029779 | A1 * | 1/2014 | Yamauchi | H04N 5/642 381/332 |
| 2014/0086443 | A1 * | 3/2014 | Morton | H04R 1/083 381/361 |
| 2014/0208926 | A1 * | 7/2014 | Shepherd | G10D 13/20 84/730 |
| 2015/0201259 | A1 * | 7/2015 | May | F16M 11/2021 248/397 |
| 2018/0330701 | A1 * | 11/2018 | Yudasaka | G10D 13/02 |
| 2018/0330703 | A1 * | 11/2018 | Ekuni | G10H 1/0535 |
| 2019/0051278 | A1 * | 2/2019 | Mori | G10H 1/00 |
| 2019/0221199 | A1 * | 7/2019 | Nomura | H04R 1/46 |
| 2019/0279608 | A1 * | 9/2019 | Abiko | G10D 3/02 |
| 2021/0067890 | A1 * | 3/2021 | Tsuge | H04R 1/24 |
| 2021/0142769 | A1 * | 5/2021 | Hietkamp | G10D 13/16 |
| 2023/0252965 | A1 * | 8/2023 | Tsuge | G10D 13/26 84/723 |

FOREIGN PATENT DOCUMENTS

| | | | | |
|---|---|---|---|---|
| JP | 2004325908 | A * | 11/2004 | G10H 3/146 |
| JP | 2017049386 | A * | 3/2017 | G10H 3/14 |
| JP | 6251458 | B1 * | 12/2017 | H04R 1/028 |
| JP | 2018146692 | A * | 9/2018 | |
| JP | 2018189911 | A * | 11/2018 | G10D 13/02 |
| JP | 2019205105 | A * | 11/2019 | G10H 1/32 |
| WO | WO-2011039842 | A1 * | 4/2011 | H04R 1/2857 |
| WO | WO-2012157191 | A1 * | 11/2012 | H04N 5/642 |
| WO | WO-2018207438 | A1 * | 11/2018 | G10D 13/00 |

OTHER PUBLICATIONS

Written Opinion issued in Intl. Appln. No. PCT/JP2021/034640 mailed Nov. 30, 2021.

CUI Devices. GF1004 Datasheet, [online], Mar. 18, 2020.03., [retrieved on Nov. 15, 2021]. Internet: <URL: https://cuidevices.com/product/resource/gf1004.pdf>, entire text, all drawings in particular, FEATURES. Cited in NPL1 and NPL2.

Office Action issued in Japanese Patent Application No. 2020-168986, mailed Oct. 1, 2024. English translation provided.

Office Action issued in Chinese Appln. No. 202180067647.4 mailed Oct. 17, 2025. English machine translation provided.

English translation of Written Opinion issued in Intl. Appln. No. PCT/JP2021/034640 mailed Nov. 30, 2021, previously cited in an IDS on Apr. 3, 2023.

Second Office Action issued in Chinese Appln. No. 202180067647.4 mailed Mar. 4, 2026. English machine translation provided.

Japanese Office Action issued in Japanese Appln. No. 2020-168986 dated Feb. 18, 2025. English machine translation provided.

Office Action issued in Chinese Appln. No. 202180067647.4 mailed May 12, 2026.

* cited by examiner

PERCUSSION INSTRUMENT DRIVING DEVICE AND PERCUSSION INSTRUMENT KIT

CROSS-REFERENCE TO RELATED APPLICATIONS

This is a continuation of International Application No. PCT/JP2021/034640 filed on Sep. 21, 2021, and claims priority from Japanese Patent Application No. 2020-168986 filed on Oct. 6, 2020, the entire content of which is incorporated herein by reference.

TECHNICAL FIELD

The present disclosure relates to a percussion instrument driving device and a percussion instrument kit that cause a percussion instrument to produce a sound corresponding to an electrical signal.

BACKGROUND ART

JP2018-189911A discloses a technique for causing a percussion instrument to produce a sound corresponding to an electrical signal. In the technique disclosed in JP2018-189911A, a speaker is provided inside a shell of a drum having the shell and a head, and an input signal which is an electrical signal is supplied to the speaker. Accordingly, a sound corresponding to the electrical signal is produced from the speaker through the drum.

JP6251458B1 relates to a stringed instrument, and discloses a technique for causing the stringed instrument to produce a sound corresponding to an electrical signal. In the technique disclosed in JP6251458B1, in a musical instrument having a sound box and a sound hole, a sound is produced from a vibration generator outside the musical instrument toward the sound hole. Accordingly, a sound corresponding to an input signal to the vibration generator is produced from the musical instrument.

SUMMARY OF INVENTION

According to the techniques disclosed in JP2018-189911A and JP6251458B1, a sound corresponding to an electrical signal can be produced from the musical instruments. However, it is impossible to produce an original sound of the percussion instrument by striking a vibration surface of the percussion instrument (for example, a drum head) with a striking member to vibrate the vibration surface.

Here, there are conceivable measures to vibrate the vibration surface of the percussion instrument to produce a sound, in which an actuator is brought into contact with the vibration surface and vibrate the vibration surface by the actuator. However, when the measures are adopted, the actuator in contact with the vibration surface may interfere with the vibration of the vibration surface, which may result in that the original sound of the percussion instrument is not produced.

The present disclosure has been made in view of the above circumstances, and an object thereof is to provide a percussion instrument driving device and a percussion instrument kit that vibrate a vibration surface of a percussion instrument in accordance with an electrical signal to produce an original sound of the percussion instrument.

The present disclosure provides a percussion instrument driving device including: an actuator including an actuator surface configured to vibrate in response to an electrical signal to vibrate a vibration surface of a percussion instrument from outside of the percussion instrument; and an actuator mount that is: disposed outside the percussion instrument; and configured to mount the actuator to the percussion instrument from outside of the percussion instrument, with the actuator surface facing the vibration surface and spaced from the vibration surface.

The present disclosure provides a percussion instrument kit including: a percussion instrument including a vibration surface; and a driving device including: an actuator disposed outside the percussion instrument and including an actuator surface configured to vibrate in response to an electrical signal to vibrate the vibration surface; and an actuator mount that is: disposed outside the percussion instrument; and configured to mount the actuator to the percussion instrument from outside of the percussion instrument, with the actuator surface facing the vibration surface and spaced from the vibration surface.

BRIEF DESCRIPTION OF DRAWINGS

The present disclosure will be described in detail based on the following figures, wherein.

DESCRIPTION OF EMBODIMENTS

Embodiments of the present disclosure will be described below with reference to the drawings.

Figure 1:
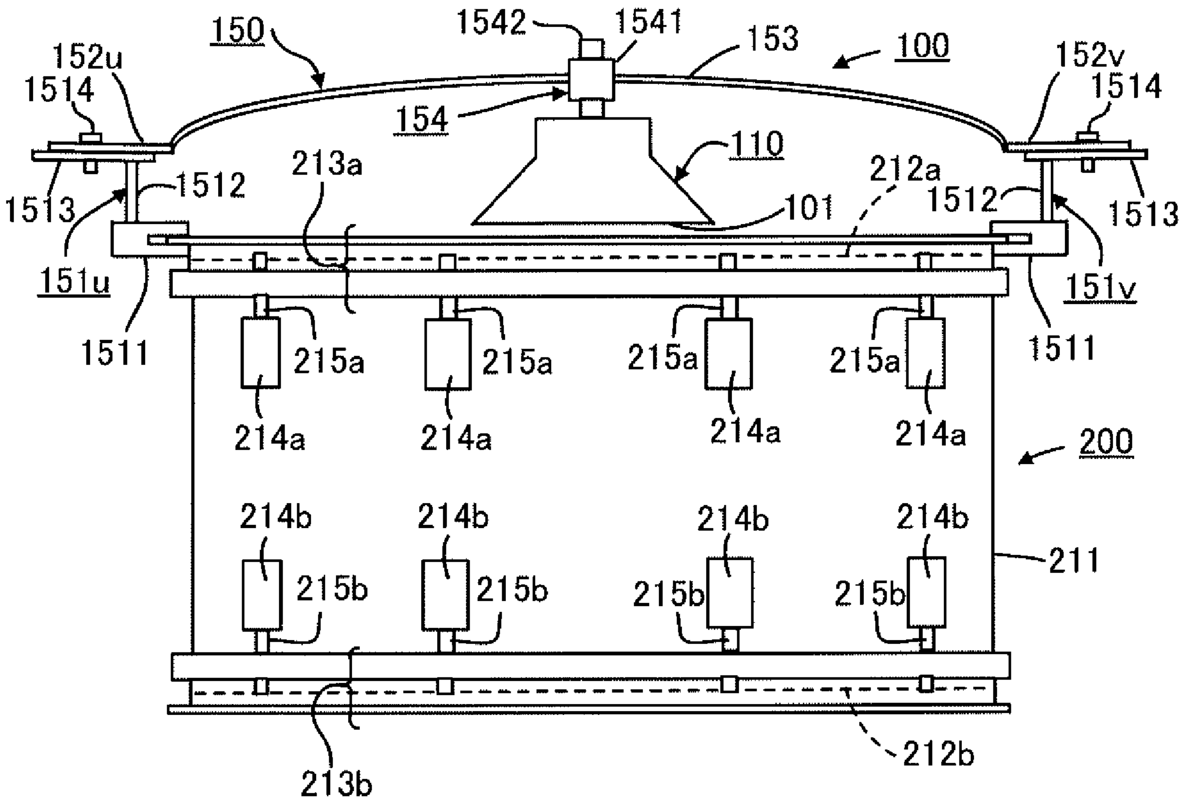
FIG. 1 is a side view showing a configuration of a percussion instrument kit including a percussion instrument driving device according to an embodiment of the present disclosure and a snare drum to which the percussion instrument driving device is attached.

FIG. 1 is a side view showing a configuration of a percussion instrument kit including a percussion instrument driving device 100 according to an embodiment of the present disclosure and a snare drum 200 to which the percussion instrument driving device 100 is attached.

The snare drum 200 includes a cylindrical shell 211 opened at both ends. The openings at both ends of the shell 211 are closed by two drum heads 212*a* and 212*b*, respectively.

Each of the drum heads 212*a* and 212*b* has a circular shape and includes a head portion whose outer periphery is pressed against an opening end of the shell 211 and an annular outer peripheral edge portion surrounding the periphery of the head portion. Each of hoops 213*a* and 213*b* has a substantially cylindrical shape and is installed so as to surround an outer peripheral edge portion of the shell 211. The hoop 213*a* includes a portion pressed against the outer peripheral edge portion of the drum head 212*a* and insertion holes into which tuning bolts 215*a* are inserted. Similarly, the hoop 213*b* includes a portion pressed against the outer peripheral edge portion of the drum head 212*b* and insertion holes into which tuning bolts 215*b* are inserted.

A plurality of lugs 214*a* are fixed, at intervals in a circumferential direction of the shell 211, in a region near the hoop 213*a* on an outer peripheral surface of the shell 211. The lug 214*a* has a screw hole extending parallel to the outer peripheral surface of the shell 211. The tuning bolt 215*a* is inserted into the insertion hole of the hoop 213*a* and screwed into the screw hole of the lug 214*a*. Similarly, a plurality of lugs 214*b* are fixed, at intervals in a circumferential direction of the shell 211, in a region near the hoop 213*b* on an outer peripheral surface of the shell 211. The lug 214*b* has a screw hole similar to the lugs 214*a*. The tuning bolt 215*b* is inserted into the insertion hole of the hoop 213*b* and screwed into the screw hole of the lug 214*b*.

In the snare drum 200, by tightening the tuning bolts 215*a*, the hoop 213*a* into which the tuning bolts 215*a* are inserted pushes the outer peripheral edge portion of the drum head 212*a* toward the lugs 214*a*, and the tension of the head portion of the drum head 212*a* is increased. Similarly, in the snare drum 200, by tightening the tuning bolts 215*b*, the hoop 213*b* into which the tuning bolts 215*b* are inserted pushes the outer peripheral edge portion of the drum head 212*b* toward the lugs 214*b*, and the tension of the head portion of the drum head 212*b* is increased.

Next, the percussion instrument driving device 100 will be described. The percussion instrument driving device 100 includes an actuator 110 having a front surface 101 (an actuator surface) that vibrates in response to an electrical signal, and a fixing portion 150 (an actuator mount) that fixes the actuator 110. Here, the fixing portion 150 is located outside the snare drum 200 including the drum head 212*a* as a vibration surface, and fixes or mounts the actuator 110 to the hoop 213*a* of the snare drum 200 such that the front surface 101 faces the vibration surface with a space interposed therebetween.

In the present embodiment, the fixing portion 150 includes two first support portions 151*u* and 151*v* fixed to an upper end outer peripheral edge portion of the hoop 213, second support portions 152*u* and 152*v* fixed to upper surfaces of the first support portions 151*u* and 151*v*, respectively, an arch-shaped third support portion 153 bridging between the second support portions 152*u* and 152*v*, and a fourth support portion 154 supporting the actuator 110 below at the center of the third support portion 153.

Each of the first support portions 151*u* and 151*v* includes a plate-shaped first horizontal portion 1511 fixed to the hoop 213*a* by sandwiching the upper end outer peripheral edge portion of the hoop 213*a*, a rod-shaped vertical portion 1512 erected from an upper surface of the first horizontal portion 1511, and a plate-shaped second horizontal portion 1513 fixed to an upper end of the vertical portion 1512. A female screw hole (not shown) is formed in the second horizontal portion 1513.

The second support portions 152*u* and 152*v* have elongated holes (not shown) extending in a radial direction of the snare drum 200. The second support portions 152*u* and 152*v* are fixed to the second horizontal portions 1513 by bolts 1514 inserted into the female screw holes of the second horizontal portions 1513 of the first support portions 151*u* and 151*v* via the respective long holes. According to this configuration, the fixing portion 150 can be attached to various snare drums 200 having different diameters.

The fourth support portion 154 includes a female screw portion 1541 fixed to the third support portion 153 and a male screw portion 1542 inserted through the female screw portion 1541. The actuator 110 is fixed to a lower end of the male screw portion 1542. In the fourth support portion 154, a height of the actuator 110 can be changed by rotating the male screw portion 1542 to adjust a distance between the front surface 101 and the drum head 212*a*.

Figure 2:
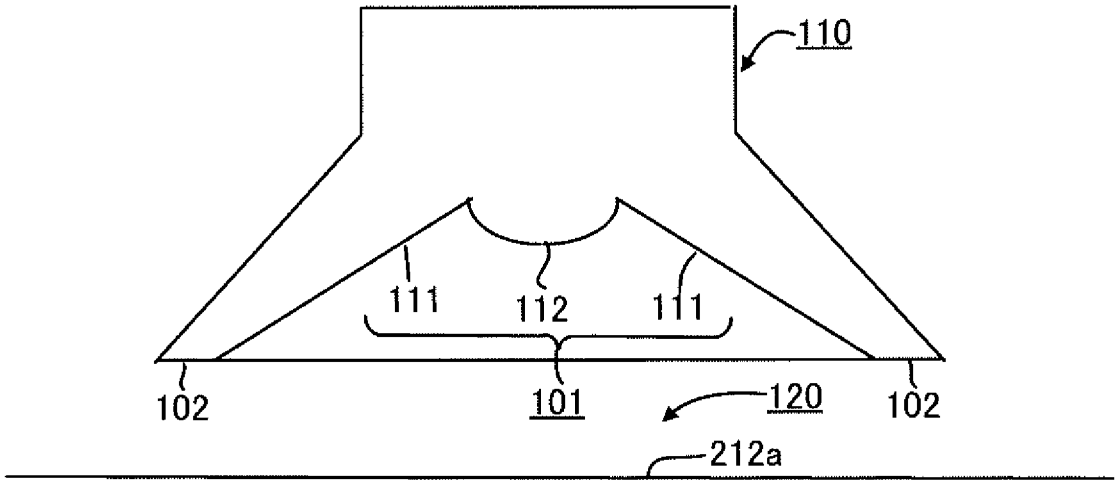
FIG. 2 is a cross-sectional view showing the configuration of the percussion instrument driving device.

In the present embodiment, the actuator 110 is a cone speaker or a speaker with a diaphragm. FIG. 2 is a cross-sectional view obtained by cutting a section of the actuator 110 and the drum head 212*a*, which is the vibration surface, along a plane including a vibration axis of the actuator 110. As shown in FIG. 2, the actuator 110 which is a cone speaker has an edge 102 surrounding the front surface 101. The edge 102 is separated from the drum head 212*a* which is the vibration surface. In other words, the edge 102 is spaced from the drum head 212*a*, in a state where the actuator 110 is mounted to the snare drum 200. An air vibration region 120 is formed by the front surface 101 and the edge 102.

More specifically, in the present embodiment, the front surface 101 includes a conical surface 111 of the cone speaker and a center cap surface 112 (a cap surface) at the center of the conical surface 111. The conical surface 111 has a mortar shape (conical shape) in which a distance to the vibration surface is shortest at the position of the edge 102 and the distance to the vibration surface increases toward the center cap surface 112. Here, a distance between the drum head 212*a*, which is the vibration surface, and the edge 102 of the cone speaker is preferably within a range of 5 mm or more and 50 mm or less. In addition, a position of the center of the front surface 101 preferably coincides with a position of the center of the drum head 212*a*.

In the present embodiment, the front surface 101 vibrates in an upper-lower direction in FIG. 2 in response to an electrical signal applied to the actuator 110, and the vibration of the front surface 101 is applied to the air vibration region 120. The electrical signal applied to the actuator 110 is an electrical signal obtained by picking up, with a microphone, a striking sound produced when the drum head 212*a* of the snare drum 200 is struck with a drum stick.

Next, an operation of the present embodiment will be described. In the present embodiment, in response to an electrical signal, which indicates a striking sound waveform of the snare drum, being applied to the actuator 110, the front surface 101 of the actuator 110 vibrates. The vibration of the front surface 101 is transmitted to the drum head 212*a* by an air spring utilizing the elasticity of compressed air in the air vibration region 120, and causes the drum head 212*a* to vibrate, thereby producing a sound from the drum head 212*a*. In response to the drum head 212*a* vibrating, vibration in the upper-lower direction is transmitted to the air in the shell 211, and causes the lower drum head 212*b* to vibrate, thereby producing a sound from the drum head 212*b*.

As described above, according to the present embodiment, by applying an electrical signal to the actuator 110 to vibrate the front surface 101, the drum head 212*a* is vibrated via the air spring, and the vibration of the drum head 212*a* can be transmitted to the drum head 212*b* via the air in the shell 211. That is, according to the present embodiment, it is possible to reproduce the same vibration transmission as the vibration transmission between individual portions of the snare drum 200 occurring when the drum head 212*a* of the snare drum is struck with a drum stick.

In the present embodiment, the fixing portion 150 is located outside the snare drum and fixes the actuator 110 such that the front surface 101 faces the drum head 212*a*, which is the vibration surface, with a space interposed therebetween. In other words, the fixing portion is located outside the snare drum 200 and mounts the actuator to the snare drum 200 from outside of the snare drum 200, with the front surface 101 facing the drum head 212*a* and spaced from the drum head 212*a*. That is, in the present embodiment, the members of the percussion instrument driving device 100 such as the actuator 110 are not disposed inside the shell 211 but are disposed outside the shell 211. Therefore, according to the present embodiment, the vibration generated in the drum head 212*a* is transmitted to the drum head 212*b* via the air in the shell 211 without being interfered.

In the present embodiment, the front surface 101 of the actuator 110 is separated from the drum head 212*a*, which is the vibration surface, and the vibration surface is vibrated by the actuator 110 via the air spring in the air vibration region 120. Thus, according to the present embodiment, the vibration of the vibration surface is not interfered by the front surface of the actuator 110, and the original striking sound of the snare drum 200 can be reproduced.

Further, in the present embodiment, the front surface 101 has a mortar shape, and an area of the front surface 101 that applies vibration to the air vibration region 120 is larger than that in a case of assuming that the front surface 101 is formed as a flat surface. Accordingly, the vibration of the front surface 101 is efficiently transmitted to the drum head 212*a*, and a powerful striking sound is produced.

Further, in the present embodiment, when the actuator 110 vibrates the drum head 212*a*, the influence of the adjustment in the tension of the drum head 212*a* is small. Therefore, there is an advantage that, when the snare drum 200 is played by the percussion instrument driving device 100, it is not necessary to particularly adjust the tuning bolts 215*a* and 215*b*, which is convenient.

In addition, in the present embodiment, the electrical signal applied to the actuator is an electrical signal obtained by picking up a striking sound of the snare drum 200, which is a percussion instrument. Thus, according to the present embodiment, by applying the electrical signal to the actuator 110, it is possible to obtain a striking sound close to the striking sound obtained when the drum head 212*a* of the snare drum 200 is struck with a drum stick.

Although one embodiment of the present disclosure has been described above, there may be other embodiments according to the present disclosure. For example, other embodiments may be as follows.

Figure 3:
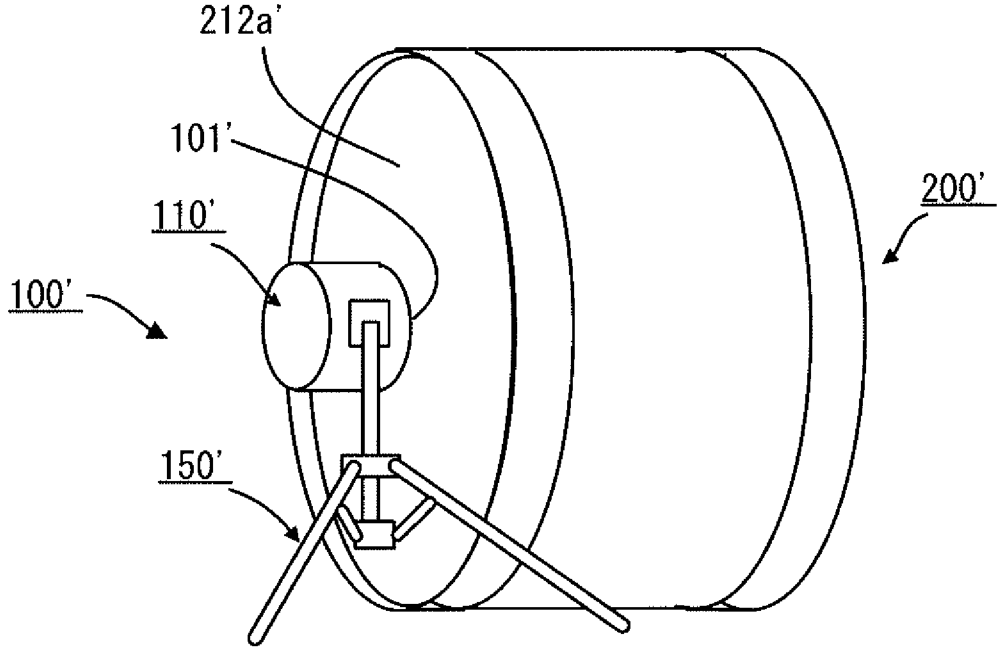
FIG. 3 is a perspective view showing configurations of a percussion instrument driving device according to another embodiment of the present disclosure and a bass drum to which the percussion instrument driving device is attached.

(1) In the above embodiment, the percussion instrument driving device is applied to the snare drum. Alternatively, the percussion instrument to be applied may be a drum other than the snare drum. FIG. 3 is a perspective view showing configurations of a percussion instrument driving device 100' according to another embodiment of the present disclosure and a bass drum 200' to which the percussion instrument driving device 100' is attached. In the percussion instrument driving device 100', a fixing portion 150' is a tripod stand. As in the above-described embodiment, the fixing portion 150' fixes an actuator 110' such that a front surface 101' of the actuator 110' faces a drum head 212*a*', which is a vibration surface, with a space interposed therebetween. Even in this embodiment, the same or similar effects as those of the above-described embodiment can be obtained.

(2) The percussion instrument to which the percussion instrument driving device according to the present disclosure is applied is not limited to the snare drum and the bass drum, and may be, for example, a tom-tom, a floor tom, a cymbal, a timpani, and a tambour.

(3) An electrical signal indicating a drum performance sound waveform of a musical composition may be supplied to the actuator 110 of the percussion instrument driving device 100, and a video of a performance scene of the musical composition by an artist may be reproduced on a screen while a sound corresponding to the electrical signal is produced from the percussion instrument. In this way, the realism of the performance can be enhanced.

The present application is based on Japanese Patent Application No. 2020-168986 filed on Oct. 6, 2020, and the contents thereof are incorporated herein as reference.

According to the percussion instrument driving device of the present disclosure, the vibration surface of the percussion instrument can be vibrated in response to an electrical signal, and an original sound of the percussion instrument can be produced.

What is claimed is:

1. A percussion instrument driving device comprising:

an actuator including an actuator surface configured to vibrate in response to an electrical signal; and an actuator mount that is:

disposed outside a percussion instrument; and configured to mount the actuator to the percussion instrument from outside of the percussion instrument, with the actuator surface facing a vibration surface of the percussion instrument and spaced from the vibration surface, wherein, in a state where the actuator is mounted to the actuator mount that is mounted to the percussion instrument, with the actuator surface disposed facing the vibration surface, vibrating the actuator surface in response to the electrical signal causes the vibration surface to vibrate, and wherein the electrical signal represents percussion-instrument performance sound of a musical composition.

2. The percussion instrument driving device according to claim 1, wherein:

the actuator is a speaker, the speaker has an edge surrounding the actuator surface, the edge is spaced from the vibration surface, in the state where the actuator is mounted to the actuator mount that is mounted to the percussion instrument, and the actuator surface and the edge form an air vibration region.

3. The percussion instrument driving device according to claim 2, wherein a distance between the vibration surface and the edge of the speaker is within a range of 5 mm or more and 50 mm or less.

4. The percussion instrument driving device according to claim 2, wherein:

the actuator surface includes a conical surface and a cap surface located at a center of the conical surface, a distance from the conical surface to the vibration surface increases toward the cap surface, and the edge is disposed at a position on the conical surface where the distance from the conical surface to the vibration surface is shortest.

5. The percussion instrument driving device according to claim 2, wherein:

the speaker includes a diaphragm, and the actuator surface is the diaphragm.

6. The percussion instrument driving device according to claim 5, wherein, in the state where the actuator is mounted to the actuator mount that is mounted to the percussion instrument, a center of the diaphragm coincides with a center of the vibration surface.

7. The percussion instrument driving device according to claim 1, wherein:

the percussion instrument is a bass drum, and the actuator mount is a stand that supports the bass drum.

8. The percussion instrument driving device according to claim 1, wherein:

the percussion instrument is a drum including a hoop, and the actuator mount mounts the actuator to the hoop.

9. The percussion instrument driving device according to claim 1, wherein the electrical signal is obtained by picking up a striking sound of the percussion instrument.

10. A percussion instrument kit comprising:
a percussion instrument including a vibration surface; and
a driving device comprising:
an actuator including an actuator surface configured to vibrate in response to an electrical signal; and
an actuator mount that is:
disposed outside the percussion instrument; and
configured to mount the actuator to the percussion instrument from outside of the percussion instrument, with the actuator surface facing the vibration surface and spaced from the vibration surface,
wherein, in a state where the actuator is mounted to the actuator mount that is mounted to the percussion instrument, with the actuator surface disposed facing the vibration surface, vibrating the actuator surface in response to the electrical signal causes the vibration surface to vibrate, and
wherein the electrical signal represents percussion-instrument performance sound of a musical composition.

* * * * *